United States Patent [19]

Pancheri et al.

[11] Patent Number: 5,733,865

[45] Date of Patent: Mar. 31, 1998

[54] PROCESSES FOR MAKING A CRYSTALLINE BUILDER HAVING IMPROVED PERFORMANCE

[75] Inventors: Eugene Joseph Pancheri, Montgomery; David Scott Bohlen, West Chester; Rose Marie Weitzel, Cincinnati; Scott William Capeci, North Bend, all of Ohio

[73] Assignee: The Procter & Gamble Company, Cincinnati, Ohio

[21] Appl. No.: 596,880

[22] Filed: Mar. 13, 1996

Related U.S. Application Data

[63] Continuation-in-part of Ser. No. 455,203, May 31, 1995, abandoned.

[51] Int. Cl.$^6$ ..................................................... C11D 7/12
[52] U.S. Cl. .......................... 510/531; 510/457; 510/509; 423/155; 423/179; 423/637; 423/641
[58] Field of Search ............................... 510/531, 509, 510/457; 423/637, 641, 155, 179

[56] References Cited

U.S. PATENT DOCUMENTS

| | | | |
|---|---|---|---|
| 1,684,782 | 9/1928 | Rubinstein . | |
| 3,932,316 | 1/1976 | Sagel et al. | 252/532 |
| 3,954,649 | 5/1976 | Lamberti | 252/174 |
| 3,957,695 | 5/1976 | Davies et al. | 252/532 |
| 3,979,314 | 9/1976 | Child | 252/140 |
| 3,981,686 | 9/1976 | Lobunez et al. | 23/302 T |
| 3,992,314 | 11/1976 | Cherney | 252/160 |
| 3,997,692 | 12/1976 | Lamberti | 427/215 |
| 4,013,578 | 3/1977 | Child et al. | 252/140 |
| 4,022,702 | 5/1977 | Curtis | 252/89 R |
| 4,035,257 | 7/1977 | Cherney | 252/160 |
| 4,040,988 | 8/1977 | Benson et al. | 252/532 |
| 4,049,586 | 9/1977 | Collier | 252/532 |
| 4,051,054 | 9/1977 | Davies et al. | 252/89 R |
| 4,076,653 | 2/1978 | Davies et al. | 252/532 |
| 4,162,994 | 7/1979 | Kawalchuk | 252/532 |
| 4,171,291 | 10/1979 | Benjamin et al. | 252/156 |
| 4,196,093 | 4/1980 | Clarke et al. | 252/99 |
| 4,348,293 | 9/1982 | Clarke et al. | 252/90 |
| 4,352,678 | 10/1982 | Jones et al. | 51/307 |
| 4,379,080 | 4/1983 | Murphy | 252/526 |
| 4,407,722 | 10/1983 | Davies et al. | 252/91 |
| 4,473,485 | 9/1984 | Greene | 252/174.12 |
| 4,605,509 | 8/1986 | Corkill et al. | 252/131 |
| 4,664,839 | 5/1987 | Rieck | 252/175 |
| 4,711,740 | 12/1987 | Carter et al. | 252/174.24 |
| 4,820,439 | 4/1989 | Rieck | 252/135 |
| 4,828,620 | 5/1989 | Mallow et al. | 106/100 |
| 4,846,409 | 7/1989 | Kaspar et al. | 241/21 |
| 4,861,503 | 8/1989 | Hollingsworth et al. | 252/135 |

(List continued on next page.)

FOREIGN PATENT DOCUMENTS

| | | | |
|---|---|---|---|
| 511607 | 4/1955 | Canada . | |
| 518 576 A2 | 12/1992 | European Pat. Off. | C11D 3/10 |
| 0 630 962 A1 | 12/1994 | European Pat. Off. | C11D 3/10 |
| 2743001 | 3/1978 | Germany | 423/420.2 |
| A-139570 | 9/1980 | Germany | C01F 5/24 |
| 158638 | 1/1983 | Germany | 423/420.2 |
| 947047 | 7/1982 | Russian Federation | 423/420.2 |
| 607274 | 8/1948 | United Kingdom . | |
| 868005 | 5/1961 | United Kingdom | 423/420.2 |
| WO 93/22411 | 11/1993 | WIPO | C11D 3/10 |

OTHER PUBLICATIONS

Friedman et al, "Economic Implications of the Deuterium Anomaly in the Brine and salts in Searles Lake, California," *Scientific Communications*, 0361–0128/82/32, pp. 694–699.

Bischoff et al, "Gaylussite Formation at Mono Lake, California," *Geochimica et Cosmochimica Acta*, vol. 55, (1991) pp. 1743–1747.

Bischoff et al, "Catalysis, Inhibition, and The Calcite–Aragonite Problem," *American Journal of Science*, vol. 266, Feb. 1968, pp. 65–79.

Aspden, "The Composition of Solid Inclusions and the Occurence of Shortite in Apatites from the Tororo Carbonatite Complex of Eastern Uganda," *Mineralogical Magazine*, Jun. 1981, vol. 44, pp. 201–204.

Milton and Axelrod, "Fused Wood–ash Stones: Fairchildite (n.sp.) $K_2XO_3CaCO_3$, Buetschliite (n.sp.) $3K_2CO_3 2CaCO_3 6H_2O$ and Calcite, $CaCO_3$, Their Essential Components," *U.S. Geological Survey*, pp. 604–622.

Johnson and Robb, "Gaylussite: Thermal Properties by Simultaneous Thermal Analysis," *American Mineralogist*, vol. 58, pp. 778–784, 1973.

Cooper, Gittins and Tuttle, "The System $Na_2CO_3-K_2CO_3-CaCO_3$ at 1 Kilobar and its significance in Carbonatite Petrogenesis," *American Journal of Science*, vol. 275, May, 1975, pp. 534–560.

Smith, Johnson and Robb, "Thermal Synthesis of Sodium Calcium Carbonate-A Potential Thermal Analysis Standard," *Thermochimica Acta*, vol. 2, No. 1, Jan. 1971 pp. 305–312.

(List continued on next page.)

*Primary Examiner*—Douglas J. McGinty
*Assistant Examiner*—Lorna M. Douyon
*Attorney, Agent, or Firm*—Ken K. Patel; Kim W. Zerby; Jacobus C. Rasser

[57] ABSTRACT

A convenient process for making builder material which has substantially improved performance and is significantly less expensive than previous builders is provided. The builder material has improved performance in that it unexpectedly has a high calcium ion exchange capacity and rate, and is easy to handle, process and disperse in washing solutions. In its broadest aspect, the invention is directed to a process involving converting starting materials (via any means including but not limited to heating and precipitating) to a builder material having at least one crystalline microstructure including a carbonate anion, calcium cation and at least one water-soluble cation. The microstructure should have a sufficient number of anions and cations so as to be "balanced" or "neutral" in charge.

1 Claim, No Drawings

U.S. PATENT DOCUMENTS

| | | | |
|---|---|---|---|
| 4,894,117 | 1/1990 | Bianchi et al. | 159/49 |
| 4,900,466 | 2/1990 | Atkinson et al. | 252/174.14 |
| 4,908,159 | 3/1990 | Davies et al. | 252/559 |
| 4,919,847 | 4/1990 | Barletta et al. | 252/558 |
| 4,966,606 | 10/1990 | Garner-Gray et al. | 252/174.14 |
| 5,219,541 | 6/1993 | Zolotoochin | 423/198 |
| 5,364,610 | 11/1994 | Merris, Jr. | 423/432 |
| 5,427,711 | 6/1995 | Sakaguchi et al. | 252/174.25 |
| 5,449,660 | 9/1995 | Munakata et al. | 505/441 |

OTHER PUBLICATIONS

Fahey, "Shortite, a New Carbonate of Sodium and Calcium," *U.S. Geological Survey*, pp. 514–518.

Bischoff, "Catalysis, Inhibition, and The Calcite–Aragonite Problem," *American Journal of Science*, Feb. 1968, vol. 266, pp. 80–90.

Frankis et al, "Subsolidus Relations in the System $Na_2CO_3-CaCO_3-H_2O$," *Nature Physical Science*, Dec. 17/24, 1973, vol. 246, pp. 124–125.

Pabst, "Synthesis, Properties, and Structure of $K_2Ca(CO_3)_2$, Buetschliite," *American Mineralogist*, 1974, vol. 59, pp. 353–358.

Bermudez de Castro et al, "Influence of Quebracho and Sodium Silicate on Flotation of Celestite and Calcite with Sodium Oleate," *International Journal of Mineral Processing*, 37, (1993), pp. 283–298.

Ahmed M. Gadalla and Magdl F. Abadir, *Calcination of Sodium–Calcium Carbonates in Air*; Ind. Eng. Chem. Fundam. 1984;23, pp. 220–223.

Brian Dickens and Walter E. Brown, *The Crystal Structures of $CaNa_2(CO_3)_2$ $5H_2O$, Synthetic Gaylussite, and $CaNa_2(CO_3)_2 2H_2O$, Synthetic Pirssonite*; Contribution from the Institute for Materials Research, National Bureau of Standards, Washington, D.C. 20234, vol. S, No. 10, Oct. 1969; pp. 2093–2103.

Naviglio and Moriconi, "Detergents Manufacture," *Soap/Cosmetics/Chemical Specialties*, Sep. 1987, pp. 34–37, 54–56.

PROCESSES FOR MAKING A CRYSTALLINE BUILDER HAVING IMPROVED PERFORMANCE

CROSS-REFERENCE TO RELATED APPLICATION

This is a continuation-in-part application of application Ser. No. 08/455,203, filed on May 31, 1995 now abandoned.

FIELD OF THE INVENTION

The invention is directed to processes for making an inexpensive builder material with improved performance. More particularly, the invention provides processes for making a builder material having crystalline microstructures containing carbonate, calcium and at least one water-soluble cation. The builder material is especially suitable for use in cleaning compositions used in fabric laundering, bleaching, automatic or hand dishwashing, hard surface cleaning and in any other application which requires the use of a builder material to remove water hardness.

BACKGROUND OF THE INVENTION

It is common practice for formulators of cleaning compositions to include, in addition to a cleaning active material, a builder to remove hardness cations (e.g. calcium cations and magnesium cations) from washing solution which would otherwise reduce the efficiency of the cleaning active material and render certain soils more difficult to remove. For example, detergent compositions typically contain an anionic surfactant and a builder to reduce the effects of hardness cations in wash solutions. In this context, the builder sequesters or "ties up" the hardness cations so as to prevent them from hindering the cleaning action of the anionic surfactant in the detergent composition.

As is well known, water-soluble phosphate materials have been used extensively as detergency builders. However for a variety of reasons, including eutrophication of surface waters allegedly caused by phosphates, there has been a desire to use other builder materials in many geographic areas. Other known builders include water-soluble builder salts, such as sodium carbonate, which can form precipitates with the hardness cations found in washing solutions. Unfortunately, the use of such builders alone does not reduce the level of hardness cations at a sufficiently rapid rate. For practical purposes, the acceptable level is not reached within the limited time required for the desired application, e.g. within 10 to 12 minutes for fabric laundering operations in North America and Japan.

Moreover, some of these water-soluble builder salts, while attractive from the point of view of cost, have several disadvantages, among which are the tendency of the precipitates formed in aqueous washing solutions (e.g. insoluble calcium carbonate) to become deposited on fabrics or other articles to be cleaned. One alleged solution to this problem has been to include a water-insoluble material which would act as a "seed crystal" for the precipitate (i.e. calcium carbonate). Of the many materials suggested for such use, finely divided calcite has been the most popular.

However, the inclusion of calcite in detergent compositions is problematic because of the sensitivity of the hardness cation/salt anion (e.g. calcium/carbonate) reaction product to poisoning by materials (e.g. polyacrylate) which may be present in the washing solution. Without being limited by theory, the poisoning problem prevents the reaction product from forming in that crystallization onto the seed crystal is inhibited. Consequently, calcite typically has to be reduced to a very small particle size (in order to have a larger surface area which is harder to poison) rendering it dusty and difficult to handle. Another problem associated with the use of calcite as a "seed crystal" for the poisons and precipitates in washing solutions is the difficulty experienced in adequately dispersing the calcite in the washing solution so that it does not deposit on fabrics or articles which have been subjected to cleaning operations. Such deposits or residues are extremely undesirable for most any cleaning operation, especially in fabric laundering and tableware cleaning situations.

The prior art is replete with suggestions for dealing with the handling and dispersability problems associated with calcite. One previously proposed means for handling calcite is to incorporate it into a slurry, but this involves high storage and transportation costs. Another proposed option involves granulating calcite with binding and dispersing agents to ensure adequate dispersment in the wash solution. However, this option also has been difficult to implement effectively in modern day detergent compositions because the calcite granules have poor mechanical strength which continue to make them difficult to handle and process. Additionally, effective binding and dispersing agents for the calcite have not been discovered to date. Specifically, most of the binding and dispersing agents proposed by the prior art are themselves poisons which reduce the "seed activity" of the calcite. Consequently, it would be desirable to have an improved builder material, and processes for making the same, which overcomes the aforementioned limitations and is easy to handle, readily dispersible in washing solutions and exhibits improved builder performance.

Several additional builder materials and combinations thereof have also been used extensively in various cleaning compositions for fabric laundering operations and dish or tableware cleaning operations. By way of example, certain clay minerals have been used to adsorb hardness cations, especially in fabric laundering operations. Further, the zeolites (or aluminosilicates) have been suggested for use in various cleaning situations. Various aluminosilicates have also been used as detergency builders. For example, water-insoluble aluminosilicate ion exchange materials have been widely used in detergent compositions throughout the industry. While such builder materials are quite effective and useful, they account for a significant portion of the cost in most any fully formulated detergent or cleaning composition. Therefore, it would be desirable to have a builder material which performs as well as or better than the aforementioned builders, and importantly, is also less expensive. Additionally, it would be desirable to have a convenient process for making such builders which could be implemented into modern day large-scale manufacturing facilities.

Accordingly, despite the aforementioned disclosures, there remains a need in the art for a process for making a builder material that exhibits improved performance and is less expensive than previous builders. There is also a need in the art for such a process in which the builder produced is easy to handle, process and disperse in washing solutions.

BACKGROUND ART

The following references are directed to builders for cleaning compositions: Atkinson et al, U.S. Pat. No. 4,900,466 (Lever); Houghton, WO 93/22411 (Lever); Allan et al, EP 518,576 A2; (Lever); Zolotoochin, U.S. Pat. No. 5,219,541 (Tenneco Minerals Company); Gamer-Gray et al, U.S. Pat. No. 4,966,606 (Lever); Davies et al, U.S. Pat. No. 4,908,159 (Lever); Carter et al, U.S. Pat. No. 4,711,740 (Lever); Greene, U.S. Pat. No. 4,473,485 (Lever); Davies et al, U.S. Pat. No. 4,407,722 (Lever); Jones et al, U.S. Pat. No. 4,352,678 (Lever); Clarke et al, U.S. Pat. No. 4,348,293 (Lever); Clarke et al, U.S. Pat. No. 4,196,093 (Lever); Benjamin et al, U.S. Pat. No. 4,171,291 (Procter & Gamble); Kowalchuk, U.S. Pat. No. 4,162,994 (Lever); Davies et al, U.S. Pat. No. 4,076,653 (Lever); Davies et al, U.S. Pat. No. 4,051,054 (Lever); Collier, U.S. Pat. No. 4,049,586 (Procter & Gamble); Benson et al, U.S. Pat. No. 4,040,988 (Procter & Gamble); Cherney, U.S. Pat. No. 4,035,257 (Procter & Gamble); Curtis, U.S. Pat. No. 4,022,702 (Lever); Child et al, U.S. Pat. 4,013,578 (Lever); Lamberti, U.S. Pat. No. 3,997,692 (Lever); Cherney, U.S. Pat. 3,992,314 (Procter & Gamble); Child, U.S. Pat. No. 3,979,314 (Lever); Davies et al, U.S. Pat. No. 3,957,695 (Lever); Lamberti, U.S. Pat. No. 3,954,649 (Lever); Sagel et al U.S. Pat. No. 3,932,316 (Procter & Gamble); Lobunez et al, U.S. Pat. No. 3,981,686 (Intermountain Research and Development Corp.); and Mallow et al, U.S. Pat. No. 4,828,620 (Southwest Research Institute).

The following references relate to crystalline minerals: Friedman et al, "Economic Implications of the Deuterium Anomaly in the Brine and salts in Searles Lake, Calif.," *Scientific Communications*, 0361-0128/82/32, pp. 694–699; Bischoff et al, "Gaylussite Formation at Mono Lake, Calif.," *Geochimica et Cosmochimica Acta*, Vol. 55, (1991) pp. 1743–1747; Bischoff, "Catalysis, Inhibition, and The Calcite-Aragonite Problem," *American Journal of Science*, Vol. 266, February 1968, pp. 65–90; Aspden, "The Composition of Solid Inclusions and the Occurrence of Shortite in Apatites from the Tororo Carbonatite Complex of Eastern Uganda," *Mineralogical Magazine*, June 1981, Vol. 44, pp. 201–4; Plummer and Busenberg, "The Solubilities of Calcite, Aragonite and Vaterite in $CO_2$—$H_2O$ Solutions Between 0° and 90° C., and an Evaluation of the Aqueous Model for the System $CaCO_3$—$CO_2$—$H_2O$," *Geochimica et Cosmochimica Acta*, Vol. 46, pp. 1011–1040; Milton and Axelrod, "Fused Wood-ash Stones: Fairchildite (n. sp.) $K_2CO_3$ $CaCO_3$, Buetschliite (n.sp.) $3K_2CO_3$ $2CaCO_3$ $6H_2O$ and Calcite, $CaCO_3$, Their Essential Components," *U.S. Geological Survey*, pp. 607–22; Evans and Milton, "Crystallography of the Heating Products of Gaylussite and Pirssonite," *Abstracts of ACA Sessions on Mineralogical Crystallography*, pp. 1104; Johnson and Robb, "Gaylussite: Thermal Properties by Simultaneous Thermal Analysis," *American Mineralogist*, Vol. 58, pp. 778–784, 1973; Cooper, Gittins and Tuttle, "The System $Na_2CO_3$—$K_2CO_3$—$CaCO_3$ at 1 Kilobar and its Significance in Carbonatite Petrogenesis," *American Journal of Science*, Vol. 275, May, 1975, pp. 534–560; Smith, Johnson and Robb, "Thermal Synthesis of Sodium Calcium Carbonate—A Potential Thermal Analysis Standard," *humica Acta*, pp. 305–12; Fahey, "Shortite, a New Carbonate of Sodium and Calcium," *U.S. Geological Survey*, pp. 514–518.

SUMMARY OF THE INVENTION

The needs in the art described above are satisfied by the present invention which provides a convenient process for making builder material which has substantially improved performance and is significantly less expensive than previous builders. The builder material has improved performance in that it unexpectedly has a high calcium ion exchange capacity and rate, and is easy to handle, process and disperse in washing solutions. In its broadest aspect, the invention is directed to a process involving converting starting materials (via any means including but not limited to heating and precipitating) to a builder material having at least one crystalline microstructure including a carbonate anion, calcium cation and at least one water-soluble cation. The microstructure should have a sufficient number of anions and cations so as to be "balanced" or "neutral" in charge.

As used herein, the phrase "crystalline microstructure" means a crystal form of molecules having a size ranging from a molecular-size structure to larger combinations or aggregations of molecular-size crystal structures. The crystal microstructure can be uniformly layered, randomly layered or not layered at all. All percentages, ratios and proportions used herein are by weight, unless otherwise specified. All documents including patents and publications cited herein are incorporated herein by reference.

In accordance with one aspect of the invention, a cleaning composition is provided. The process comprises the steps of: (a) blending a first neutral salt material containing a water-soluble cation with a second neutral salt material containing a calcium cation to form a blended mixture, wherein one of the first and second neutral salt materials contains a carbonate anion and the other is free of carbonates; (b) heating the blended mixture until the builder material is formed, wherein the builder material has a crystalline microstructure in which the carbonate anion, the calcium cation and the water-soluble cation are contained.

Preferred embodiments of the process invention include defining the first neutral salt to be $KHCO_3$, $NaHCO_3$ or a blend thereof and the second neutral salt to be CaO. Another preferred aspect of the invention involves having the heating step conducted in a $CO_2$ atmosphere. The heating step can be performed at a temperature of at least 350° C. for at least 0.5 hours, or more preferably, at a temperature of at least about 550° C. for at least about 10 hours.

The process may also include the step of grinding or crushing the builder material such that its particle size is from about 0.1 microns to about 50 microns. Other embodiments include having the first neutral salt $Na_2CO_3$ and the second neutral salt $Ca(CO_3)$, wherein an excess amount of the first neutral salt is included in the blending step. Alternatively, the first neutral salt can be $Na_2CO_3$, $K_2CO_3$, or mixtures thereof and the second neutral salt CaO. Still another embodiment involves having the first neutral salt $NaHCO_3$, $KHCO_3$, or mixtures thereof and the second neutral salt $CaCO_3$.

In accordance with another aspect of the invention, another process of making a builder material for use in a cleaning composition is provided. The process comprises the steps of: (a) heating a neutral salt material containing a water-soluble cation, a carbonate anion and a calcium cation until a builder material is formed, wherein the builder material has a crystalline microstructure in which the carbonate anion, the calcium cation and the water-soluble cation are contained; and (b) sizing the builder material to a predetermined particle size range. Yet another embodiment involves having Trona ore ($NaCO_3.NaHCO_3.2H_2O$) and Shortite ($Na_2Ca_2(CO_3)_2$) as the first and second neutral salts, respectively. Preferred embodiments include defining the neutral salt material as $Na_2Ca_2(CO_3)_3$ and optionally, adding an excess amount of $Na_2CO_3$, $K_2CO_3$, and mixtures thereof. The sizing step may include the step of grinding the builder material.

Still another aspect of invention is directed to a process of making a builder material for use in a cleaning composition comprising the steps of: (a) forming an aqueous solution of a neutral salt material containing a water-soluble cation and a carbonate anion; (b) adding an effective amount of a base material containing a calcium cation to the aqueous solution such that a precipitate builder having a crystalline microstructure in which the carbonate anion, the calcium cation and the water-soluble cation are contained is formed; and (c) drying the precipitate builder so as to form the builder material. A preferred embodiment involves defining the neutral salt material to be $NaHCO_3$ or $Na_2CO_3$ and the base material to be $Ca(OH)_2$ or $Ca(HCO_3)_2$.

Another process of making a builder material for use in a cleaning composition is provided. The process comprises the steps of: (a) continuously stirring a mixture of a first neutral salt material containing a water-soluble cation and a second neutral salt material containing a calcium cation to form a blended mixture; (b) heating the blended mixture until the builder material is formed, wherein the builder material has a crystalline microstructure in which the carbonate anion, the calcium cation and the water-soluble cation are contained. Preferred aspects include having the first neutral salt be $K_2CO_3$ or $Na_2CO_3$ and the second neutral salt is $Na_2Ca_2(CO_3)_3$ or $Ca(CO_3)$. The first neutral salt or the second may also be present in an stoichiometric excess amount in the blended mixture. Lastly, the invention provides cleaning compositions made according to any one or combinations of processes described herein.

Accordingly, it is an object of the invention to provide a process for making a builder material that exhibits improved performance and is less expensive than previous builders. It is also an object of the invention to provide such a process that forms a builder which is easy to handle, process and disperse in washing solutions. These and other objects, features and attendant advantages of the present invention will become apparent to those skilled in the art from a reading of the following detailed description of the preferred embodiments and the appended claims.

DETAILED DESCRIPTION OF THE PREFERRED EMBODIMENT

The builder material produced by the process invention can be used in a variety of cleaning compositions including but not limited to fabric laundering, fabric or surface bleaching, automatic or hand dishwashing, hard surface cleaning and any other application which requires the use of a builder material to remove water hardness.

Builder

The builder material that is produced by the process described herein after is "crystalline" in that it includes a crystalline microstructure of a carbonate anion, calcium cation and a water-soluble cation. It should be understood that the builder material may be comprised of multiple crystalline microstructures or be entirely comprised of such microstructures. Also, each crystalline microstructure can include multiple carbonate anions, calcium cations and water-soluble cations, examples of which are presented hereinafter. The compositions of the invention preferably include an effective mount of the builder material. By "effective amount" as used herein, it is meant that the level of the builder material in the composition is sufficient to sequester an adequate amount of hardness in the washing solution such that the active cleaning ingredient is not overly inhibited. The actual amount will vary widely depending amount the particular application of the cleaning composition. However, typical amounts are from about 2% to about 80%, more typically from about 4% to about 60%, and most typically from about 6% to about 40%, by weight of the cleaning composition.

While not intending to be bound by theory, it is believed that the preferred builder material used in the compositions herein is "crystalline" in that it includes crystalline microstructures of a carbonate anion, a calcium cation, and a water-soluble cation. It should be understood that the builder material may be comprised of multiple crystalline microstructures and other material or be comprised entirely of such microstructures. Also, each individual crystalline microstructure can include multiple carbonate anions, calcium cations, and water-soluble cations, examples of which are presented hereinafter. The "crystalline" nature of the builder material can be detected by X-ray Diffraction techniques known by those skilled in the art. X-ray diffraction patterns are commonly collected using Cu $K_{alpha}$ radiation on an automated powder diffractometer with a nickel filter and a scintillation counter to quantify the diffracted X-ray intensity. The X-ray diffraction diagrams are typically recorded as a pattern of lattice spacings and relative X-ray intensities. In the Joint Committee on Powder Diffraction Standards, X-ray diffraction diagrams of corresponding preferred builder materials include, but are not limited to, the following numbers: 21-0343, 21-1287, 21-1348, 22-0476, 24-1065, 25-0626, 25-0627, 25-0804, 27-0091, 28-0256, 29-1445, 33-1221, 40-0473, and 41-1440.

As mentioned previously, a preferred embodiment of the builder material envisions having the crystalline microstructure with the following general formula

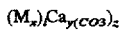

wherein x and i are integers from 1 to 15, y is an integer from 1 to 10, z is an integer from 2 to 25, $M_i$ include various cations, at least one of which is a water-soluble cation, and the equation $\Sigma_{i=1-15}(x_i$ multiplied by the valence of $M_i)+ 2y=2z$ is satisfied such that the formula has a neutral or "balanced" charge. Of course, if anions other than carbonate are present, their particular charge or valence effects would be added to the right side of the above-referenced equation.

Preferably, the water-soluble cation is selected from the group consisting of water-soluble metals, hydrogen, boron, ammonium, silicon, tellurium and mixtures thereof. More preferably, the water-soluble cation is selected from the group consisting of Group IA elements (Periodic Table), Group IIA elements (Periodic Table), Group IIIB elements (Periodic Table), ammonium, lead, bismuth, tellurium and mixtures thereof. Even more preferably, the water-soluble cation is selected from the group consisting of sodium, potassium, hydrogen, lithium, ammonium and mixtures thereof. The most preferred are sodium and potassium. In addition to the carbonate anion in the crystalline microstructure of the builder material described herein, one or more additional anions may be incorporated into the crystalline microstructure so long as the overall charge is balanced or neutral. By way of a nonlimiting example, anions selected from the group consisting of chloride, sulfate, fluoride, oxygen, hydroxide, silicon dioxide, chromate, nitrate, borate and mixtures thereof can be used in the builder material. Those skilled in the art should appreciate that additional water-soluble cations, anions and combinations thereof beyond those of which have been described herein can be used in the crystalline microstructure of the builder material without departing from the scope of the invention. It should be understood that waters of hydration may be present in the aforementioned components.

Particularly preferred materials which can be used as the crystalline microstructures in the builder material are selected from the group consisting of $Na_2Ca(CO_3)_2$, $K_2Ca(CO_3)_2$, $Na_2Ca_2(CO_3)_3$, $NaKCa(CO_3)_2$, $NaKCa_2(CO_3)_3$, $K_2Ca_2(CO_3)_3$, and combinations thereof. An especially preferred material for the builder described herein is $Na_2Ca(CO_3)_2$. Other suitable materials for use in the builder material include any one or combination of:

Afghanite, $(Na,Ca,K)_8(Si,Al)_{12}O_{24}(SO_4,Cl,CO_3)_3.(H_2O)$;

Andersonite, $Na_2Ca(UO_2)(CO_3)_3.6(H_2O)$;

AshcroftineY, $K_5Na_5(Y,Ca)_{12}Si_{28}O_{70}(OH)_2(CO_3)_8$·n $(H_2O)$, wherein n is 3 or 8;

Beyerite, $(Ca,Pb)Bi_2(CO_3)_2O_2$;

Borcarite, $Ca_4MgB_4O_6(OH)_6(CO_3)_2$;

Burbankite, $(Na, Ca)_3(Sr,Ba,Ce)_3(CO_3)_5$;

Butschliite, $K_2Ca(CO_3)_2$;

Cancrinite, $Na_6Ca_2Al_6Si_6O_{24}(CO_3)_2$;

Carbocernaite, $(Ca,Na)(Sr,Ce,Ba)(CO_3)_2$;

Carletonite, $KNa_4Ca_4Si_8O_{18}(CO_3)_4(OH,F).(H_2O)$;

Davyne, $(Na,Ca,K)_8Al_6Si_6O_{24}(Cl,SO_4,CO_3)_{2-3}$;

Donnayite Y, $Sr_3NaCaY(CO_3)_6 \cdot 3(H_2O)$;

Fairchildite, $K_2Ca(CO_3)_2$;

Ferrisurite, $(Pb,Ca)_3(CO_3)_2(OH,F)(Fe,Al)_2Si_4O_{10}(OH)_2 \cdot n(H_2O)$, wherein n is an integer from 1 to 20;

Franzinite, $(Na, Ca)_7(Si,Al)_{12}O_{24}(SO_4,CO_3,OH,Cl)_3 \cdot (H_2O)$;

Gaudefroyite, $Ca_4Mn_3(BO_3)_3(CO_3)(O,OH)_3$;

Gaylussite, $Na_2Ca(CO_3)_2 \cdot 5(H_2O)$;

Girvasite, $NaCa_2Mg_3(PO_4)_2[PO_2(OH)_2](CO_3)(OH)_2 \cdot 4(H_2O)$;

Gregoryite, $NaKCa(CO_3)_2$;

Jouravskite, $Ca_6Mn_2(SO_4,CO_3)_4(OH)_{12} \cdot n(H_2O)$, wherein n is 24 or 26;

Kamphaugite Y, $CaY(CO_3)_2(OH) \cdot (H_2O)$;

Kettnerite, $CaBi(CO_3)OF$ or $CaBi(CO_3)F$;

Khannaeshite, $(Na,Ca)_3(Ba,Sr,Ce,Ca)_3(CO_3)_5$;

Lepersonnite Gd, $Ca(Gd,Dy)_2(UO_2)_{24}(CO_3)_8(Si_4O_{12})O_{16} \cdot 60(H_2O)$;

Liottite, $(Ca,Na,K)_8(Si,Al)_{12}O_{24}(SO_4,CO_3,Cl,OH)_4 \cdot n(H_2O)$, wherein n is 1 or 2;

Mckelveyite Y, $Ba_3Na(Ca,U)Y(CO_3)_6 \cdot 3(H_2O)$;

Microsommite, $(Na,Ca,K)_{7-8}(Si,Al)_{12}O_{24}(Cl,SO_4,CO_3)_{2-3}$;

Mroseite, $CaTe(CO_3)O_2$;

Natrofairchildite, $Na_2Ca(CO_3)_2$;

Nyerereite, $Na_2Ca(CO_3)_2$;

Remondite Ce, $Na_3(Ce,La,Ca,Na,Sr)_3(CO_3)_5$;

Sacrofanite, $(Na,Ca,K)_9(Si,Al)_{12}O_{24}[(OH)_2,SO_4,CO_3,Cl_2]_x \cdot n(H_2O)$, wherein x is 3 or 4 and n is an integer from 1 to 20;

Schrockingerite, $NaCa_3(UO_2)(CO_3)_3(SO_4)F \cdot 10(H_2O)$;

Shortite, $Na_2Ca_2(CO_3)_3$;

Surite, $Pb(Pb,Ca)(Al,Fe,Mg)_2(Si,Al)_4O_{10}(OH)_2(CO_3)_2$;

Tunisite, $NaCa_nAl_4(CO_3)_4(OH)_8Cl$, wherein n is 1 or 2;

Tuscanite, $K(Ca,Na)_6(Si,Al)_{10}O_{22}[SO_4,CO_3,(OH)_2] \cdot (H_2O)$;

Tyrolite, $CaCu_5(AsO_4)_2(CO_3)(OH)_4 \cdot 6(H_2O)$;

Vishnevite, $(Na,Ca,K)_6(Si,Al)_{12}O_{24}(SO_4,CO_3,Cl_2)_{2-4} \cdot n(H_2O)$; and Zemkorite, $Na_2Ca(CO_3)_2$.

The builder material used in the compositions herein also unexpectedly have improved builder performance in that they have a high calcium ion exchange capacity. In that regard, the builder material has a calcium ion exchange capacity, on an anhydrous basis, of from about 100 mg to about 700 mg equivalent of calcium carbonate hardness/gram, more preferably from about 200 mg to about 650 mg, and even more preferably from about 300 mg to about 600 mg, and most preferably from about 350 mg to about 570 mg, equivalent of calcium carbonate hardness per gram of builder. Additionally, the builder material used in the cleaning compositions herein unexpectedly have improved calcium ion exchange rate. On an anhydrous basis, the builder material has a calcium carbonate hardness exchange rate of at least about 5 ppm, more preferably from about 10 ppm to about 150 ppm, and most preferably from about 20 ppm to about 100 ppm, $CaCO_3$/minute per 200 ppm of the builder material. A wide variety of test methods can be used to measure the aforementioned properties including the procedure exemplified hereinafter and the procedure disclosed in Corkill et al, U.S. Pat. No. 4,605,509 (issued Aug. 12, 1986), the disclosure of which is incorporated herein by reference.

It has been surprisingly found that the cleaning or detergent composition described herein has unexpectedly improved cleaning performance when it contains selected surfactants and the builder material at selected pH and concentration levels as determined in the aqueous solution in which the cleaning composition is used. While not intending to be bound by theory, it is believed that a delicate balance of surfactants having various hydrocarbon chain structures at certain usage concentrations and the builder material at certain usage pH levels can lead to superior cleaning performance. To that end, the following relationship or equation should be satisfied in order to achieve the aforementioned superior cleaning and builder performance results:

$$I=S/(100*N*A^2)$$

wherein I is the Index of Surface Activity of a given surfactant in a cleaning composition; S is the ppm of the surfactant at the intended usage concentration of the cleaning composition; N is a value based on the hydrocarbon chainlength of the surfactant wherein each carbon in the main hydrocarbon chain are counted as 1, each carbon in branched or side chains are counted as 0.5, and benzene rings individually are counted as 3.5 if they lie in the main chain and 2 if they do not lie in the main chain; and A is a constant with a value between 0 and 6 which is determined by measuring the pH of the builder material under certain specific conditions and normalizing it. Specifically, A is the normalized pH difference between the builder material in an aqueous cleaning solution alone or by itself and the combination of the builder material and the surfactant in the aqueous cleaning solution, wherein the temperature of the aqueous cleaning solution is at 35° C. The value of the Index of Surface Activity should be above about 0.75 for good performance. It is more preferred for the Index to be above about 1.0, even more preferably it is above about 1.5, and most preferably it is above about 2.0. An example of the use of the Index of Surface Activity is given in Example XXII.

The particle size diameter of the builder material in an aqueous solution is preferably from about 0.1 microns to about 50 microns, more preferably from about 0.3 microns to about 25 microns, even more preferably from about 0.5 microns to about 18 microns, and most preferably from about 0.7 microns to about 10 microns. While the builder material used in the compositions herein perform unexpectedly superior to prior builders at any particle size diameter, it has been found that optimum performance can be achieved within the aforementioned particle sized diameter ranges. The phrase "particle size diameter" as used herein means the particle size diameter of a given builder material at its usage concentration in water (after 10 minutes of exposure to this water solution at a temperature of 50° F. to 130° F.) as determined by conventional analytical techniques such as, for example, microscopic determination using a scanning electron microscope (SEM), Coulter Counter or Malvern particle size instruments. In general, the particle size of the builder not at its usage concentration in water can be any convenient size.

Process

In accordance with the invention, one process embodiment involves blending a first neutral salt material containing a water-soluble cation and a carbonate anion with a second neutral salt material containing a calcium cation to form a blended mixture. The blended mixture is heated until the builder material is formed, wherein the builder material has a crystalline microstructure in which the carbonate anion, the calcium cation and the water-soluble cation are contained. In the typical heating step, the temperature is from about 350° C. to about 700° C. and occurs for at least 0.5 hours, preferably for at least 4 hours, and preferably in a $CO_2$ atmosphere. The $CO_2$ atmosphere is preferred in the instant process and is beneficial from 0.01 atmospheres to 10 or more atmospheres.

Optionally, after the heating is complete, the resulting crystalline microstructures or material undergoes sufficient grinding and/or crushing operations, either manually or using conventional apparatus, such that the builder material is suitably sized for incorporation into the cleaning composition. The actual time, temperature and other conditions of the heating step will vary depending upon the particular starting materials selected. The builder material is preferably cooled after heating, and more preferably, at a relatively slow rate. By way of example, in a preferred embodiment, equimolar amounts of sodium carbonate ($Na_2CO_3$) and calcium carbonate ($CaCO_3$) are blended thoroughly and heated in a $CO_2$ atmosphere at a temperature of about 550° C. for at least 10 hours, preferably for about 100 hours, and then crushed to achieve the desired crystalline builder material.

Another process of making the builder material according to the invention involves heating Shortite or $Na_2Ca_2(CO_3)_3$, preferably in a $CO_2$ atmosphere at a temperature of 300° C. to 500° C. for about 100 hours, to form the builder material as described previously. Yet another process involves heating Shortite or $Na_2Ca_2(CO_3)_3$ and sodium carbonate, preferably in a $CO_2$ atmosphere at a temperature of 600° C. for about 100 hours, to form the desired builder material. Another process embodiment contemplates heating calcium oxide (CaO) and $NaHCO_3$, preferably in a $CO_2$ atmosphere at a temperature of 450° C. for about 100 hours. Yet another embodiment involves adding $Ca(OH)_2$ to a concentrated solution of $NaHCO_3$, collecting the precipitate and drying it to form the desired builder material.

Additionally, a saturated solution of $Na_2CO_3$, to which a $Ca(OH)_2$ solution is added so as to form a suspension, is flash or spray dried at a sufficient temperature and residence time in a $CO_2$ atmosphere such that the desired builder material is formed. Other embodiments include starting with $Na_2CO_3$,$K_2CO_3$, or mixtures thereof and CaO and subject it to heating in the manner described herein. Yet another embodiment involves heating Trona ore ($NaCO_3.NaHCO_3.H_2O$) and Shortite (or $Na_2Ca_2(CO_3)_3$) in a similar fashion. Still another embodiment involves heating $NaHCO_3$, $KHCO_3$, or mixtures thereof and $CaCO_3$. In this regard, naturally occurring versions of the staring (reactants) materials described herein which may contain small amounts on the ppm scale of impurities is preferred over highly purified starting ingredients.

It will be appreciated by those skilled in the art that lower and higher temperatures for the aforedescribed methods is possible provided longer heating times are available for the lower temperatures and pressurized $CO_2$ atmospheres are available for the higher temperatures. Additionally, use of a rotating or stirred reactor or kiln, preferably with a low chromium content reactor vessel, can reduce greatly the required heating or reaction time to obtain the desired crystalline microstructure builder material. In that regard, either direct fired or indirect fired kilns can be used, although direct fired kilns are preferred. It has been found that "hot spots" in the reaction vessel or kiln can undesirably lead to the conversion of calcium carbonate to calcium oxide and carbon dioxide. Accordingly, it is preferable to apply the heat to the reaction uniformly to avoid such "hot spots" and thus the formation of calcium oxide and carbon dioxide from the calcium carbonate reactant when used.

A combination of two or more of the processes described herein can be used to achieve a builder material suitable for use in the compositions described herein. Another variation of the processes described herein contemplates blending and heating an excess of one of the starting ingredients (e.g. $Na_2CO_3$) such that the balance of the starting ingredient can be used as an active ingredient in the cleaning composition in which the builder material is contained. Additionally, seed crystals of the builder material may be used to enhance the speed or time it takes to form the builder material from the starting components (e.g. use crystalline $Na_2Ca(CO_3)_2$ as a seed crystal for heating/reacting $Na_2CO_3$ and $CaCO_3$) or especially for the $Ca(OH)_2$ and $NaHCO_3$ reaction. Various water-soluble cations can be readily substituted for other water-soluble cations in the methods or processes described herein. For example, sodium (Na) can be wholly or partially substituted with potassium (K) in any of the aforementioned processes of making the builder material.

It is also preferable for the reactants to be preconditioned before heating in, for example a kiln, by spray drying, tableting or agglomerating one or more of the reactants. In this way, the speed of conversion of the reactants to the builder material and its ultimate processability is unexpectedly enhanced. The starting and/or reactant materials are preferably in the form of spray dried particles, tablets or agglomerates which is beneficial in forming the builder material in an expeditious manner. Additionally, when the reactants are in the form of agglomerates, it is preferably for the median particle size to be from about 500 to about 25,000 microns, and most preferably from about 500 to about 1000 microns, which also enhances the speed of conversion of the starting materials to the desired builder material. Jet Milling or crushing the reactants or final builder material is a preferred process over pin milling for particle size reduction. All of this unexpectedly has positive effects on the processing time and performance of the builder material produced.

As briefly mentioned, use of an excess of one or more of the reactants is also beneficial in this regard. Furthermore, the slow addition of any one of the reactants to the reaction mixture has also been found to be unexpectedly beneficial. By way of example, an excess of calcium carbonate in combination with the slow addition of sodium carbonate has been found to form the instant builder material in an unexpectedly expeditious manner. Also, preheating the starting materials prior to input into the kiln enhances the speed of conversion to the builder material.

Adjunct Builders

One or more auxiliary builders can be used in conjunction with the builder material produced by the process invention herein to further improve the performance of the compositions into which the builder material is incorporated. For example, the auxiliary builder can be selected from the group consisting of aluminosilicates, crystalline layered silicates, MAP zeolites, titrates, amorphous silicates, polycarboxylates, sodium carbonates and mixtures thereof. Another particularly suitable option is to include amorphous material coupled with the crystalline microstructures in the builder material. In this way, the builder material includes a "blend" of crystalline microstructures and amorphous material or microstructures to give improved builder performance. Other suitable auxiliary builders are described hereinafter.

Optionally, the compositions into which the builder material made by the present process is incorporated can also comprise a detergent aluminosilicate builder which are referenced as aluminosilicate ion exchange materials and sodium carbonate. The aluminosilicate ion exchange materials used herein as a detergent builder preferably have both a high calcium ion exchange capacity and a high exchange rate. Without intending to be limited by theory, it is believed that such high calcium ion exchange rate and capacity are a function of several interrelated factors which derive from the method by which the aluminosilicate ion exchange material is produced. In that regard, the aluminosilicate ion exchange materials used herein are preferably produced in accordance with Corkill et al, U.S. Pat. No. 4,605,509 (Procter & Gamble), the disclosure of which is incorporated herein by reference.

Preferably, the aluminosilicate ion exchange material is in "sodium" form since the potassium and hydrogen forms of the instant aluminosilicate do not exhibit the as high of an exchange rate and capacity as provided by the sodium form. Additionally, the aluminosilicate ion exchange material preferably is in over dried form so as to facilitate production of crisp detergent agglomerates as described herein. The aluminosilicate ion exchange materials used herein preferably have particle size diameters which optimize their effectiveness as detergent builders. The term "particle size diameter" as used herein represents the average particle size diameter of a given aluminosilicate ion exchange material as determined by conventional analytical techniques, such as microscopic determination and scanning electron microscope (SEM). The preferred particle size diameter of the aluminosilicate is from about 0.1 micron to about 10 microns, more preferably from about 0.5 microns to about 9 microns. Most preferably, the particle size diameter is from about 1 microns to about 8 microns.

Preferably, the aluminosilicate ion exchange material has the formula $$Na_z[(AlO_2)_z.(SiO_2)_y]xH_2O$$

wherein z and y are integers of at least 6, the molar ratio of z to y is from about 1 to about 5 and x is from about 10 to about 264. More preferably, the aluminosilicate has the formula $$Na_{12}[(AlO_2)_{12}.(SiO_2)_{12}]xH_2O$$

wherein x is from about 20 to about 30, preferably about 27. These preferred aluminosilicates are available commercially, for example under designations Zeolite A, Zeolite B and Zeolite X. Alternatively, naturally-occurring or synthetically derived aluminosilicate ion exchange materials suitable for use herein can be made as described in Krummel et al, U.S. Pat. No. 3,985,669, the disclosure of which is incorporated herein by reference.

The aluminosilicates used herein are further characterized by their ion exchange capacity which is at least about 200 mg equivalent of $CaCO_3$ hardness/gram, calculated on an anhydrous basis, and which is preferably in a range from about 300 to 352 mg equivalent of $CaCO_3$ hardness/gram. Additionally, the instant aluminosilicate ion exchange materials are still further characterized by their calcium ion exchange rate which is at least about 2 grains $Ca^{++}$/gallon/minute/–gram/gallon, and more preferably in a range from about 2 grains $Ca^{++}$/gallon/minute/–gram/gallon to about 6 grains $Ca^{++}$/gallon/minute/–gram/gallon.

Detersive Surfactant

Preferably, the compositions into which the builder material made according to the instant process invention will comprise at least about 1%, preferably from about 1% to about 55%, and most preferably from about 10 to 40%, by weight, of a detersive surfactant selected from the group consisting of anionic surfactants, nonionic surfactants, cationic surfactants, zwitterionic surfactants and mixtures. Nonlimiting examples of surfactants useful herein include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)x(CHOSO_3^-M^+)$ $CH_3$ and $CH_3(CH_2)_y(CHOSO_3^-M^+) CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

It should be understood, however, that certain surfactants are less preferred than others. For example, the $C_{11}$–$C_{18}$ alkyl benzene sulfonates ("LAS") are less preferred, although they may be included in the compositions herein, in that they may interfere or otherwise act as a poison with respect to the builder material.

Adjunct Detergent Ingredients

The builder material made by the present process can include additional detergent ingredients and/or, any number of additional ingredients when incorporated in cleaning compositions. These adjunct ingredients include other detergency builders, bleaches, bleach activators, suds boosters or suds suppressors, anti-tarnish and anticorrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

Other builders can be generally selected from the various water-soluble, alkali metal, ammonium or substituted ammonium phosphates, polyphosphates, phosphonates, polyphosphonates, carbonates, borates, polyhydroxy sulfonates, polyacetates, carboxylates, and polycarboxylates. Preferred are the alkali metal, especially sodium, salts of the above. Preferred for use herein are the phosphates, carbonates, $C_{10-18}$ fatty acids, polycarboxylates, and mixtures thereof. More preferred are sodium tripolyphosphate, tetrasodium pyrophosphate, citrate, tartrate mono- and di-succinates, and mixtures thereof (see below).

In comparison with amorphous sodium silicates, crystalline layered sodium silicates exhibit a clearly increased calcium and magnesium ion exchange capacity. In addition, the layered sodium silicates prefer magnesium ions over calcium ions, a feature necessary to insure that substantially all of the "hardness" is removed from the wash water. These crystalline layered sodium silicates, however, are generally more expensive than amorphous silicates as well as other builders. Accordingly, in order to provide an economically feasible laundry detergent, the proportion of crystalline layered sodium silicates used must be determined judiciously.

The crystalline layered sodium silicates suitable for use herein preferably have the formula

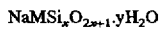

wherein M is sodium or hydrogen, x is from about 1.9 to about 4 and y is from about 0 to about 20. More preferably, the crystalline layered sodium silicate has the formula

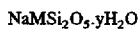

wherein M is sodium or hydrogen, and y is from about 0 to about 20. These and other crystalline layered sodium silicates are discussed in Corkill et al, U.S. Pat. No. 4,605,509, previously incorporated herein by reference.

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

Examples of nonphosphorus, inorganic builders are tetraborate decahydrate and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylene malonic acid. Some of these materials are useful as the water-soluble anionic polymer as hereinafter described, but only if in intimate admixture with the non-soap anionic surfactant.

Other suitable polycarboxylates for use herein are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference. Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. Nos. 3,933,672, issued Jan. 20, 1976 to Bartoletta et al., and 4,136,045, issued Jan. 23, 1979 to Gault et al., both incorporated herein by reference.

Suitable smectite clays for use herein are described in U.S. Pat. No. 4,762,645, Tucker et al, issued Aug. 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al, issued May 5, 1987, both incorporated herein by reference.

In order to make the present invention more readily understood, reference is made to the following examples, which are intended to be illustrative only and not intended to be limiting in scope.

EXAMPLE I

Calcium Sequestration and Rate of Sequestration Test

The following illustrates a step-by-step procedure for determining the amount of calcium sequestration and the rate thereof for the builder material produced by the instant process invention described herein.

1. Add to 750 ml of 35° C. distilled water, sufficient water hardness concentrate to produce 171 ppm of CaCO3;

2. Stir and maintain water temperature at 35° C. during the experiment;

3. Add 1.0 ml of 8.76% KOH to the water;

4. Add 0.1085 gm of KCl;

5. Add 0.188 gm of Glycine;

6. Stir in 0.15 gm of $Na_2CO_3$;

7. Adjust pH to 10.0 using 2N HCl and maintain throughout the test;

8. Stir in 0.15 gm of a builder according the invention and start timer;

9. Collect an alliquot of solution at 30 seconds, quickly filter it through a 0.22 micron filter, quickly acidify it to pH 2.0–3.5 and seal the container;

10. Repeat step 9 at 1 minute, 2 minutes, 4 minutes, 8 minutes, and 16 minutes;

11. Analyze all six alliquots for $CaCO_3$ content via ion selective electrode, titration, quantitative ICP or other appropriate technique;

12. The Sequestration rate in ppm $CaCO_3$ sequestered per 200 ppm of builder is 171 minus the $CaCO_3$ concentration at one minute;

13. Amount of sequestration (in ppm $CaCO_3$ per gram/liter of builder) is 171 minus the $CaCO_3$ concentration at 16 minutes times five.

For the builder material particle sizes according to the instant invention which are on the low end of the particle size range, a reference sample is needed which is run without hardness in order to determine how much of the builder passes through the filter. The above calculations should then be corrected to eliminate the contribution of the builder to the apparent calcium concentration.

EXAMPLES II–VI

In the following examples, the builder material according to the invention is produced as indicated in a standard high temperature oven. In all the following tables M refers to Moles of the specified reactant.

|  | II | III | IV | V | VI |
|---|---|---|---|---|---|
| $Na_2CO_3$ |  |  |  | 1 M |  |
| $NaHCO_3$ | 2 M |  | 1 M | 2 M |  |
| $KHCO_3$ |  | 2 M | 1 M |  |  |
| $Na_2Ca_2(CO_3)_3$ |  |  |  |  | 1 M |
| CaO | 1 M | 1 M | 1 M | 1 M |  |
| $CO_2$ Pressure (Atmospheres) | 1 | 2 | 1 | 1 | 1 |
| Stirred Reactor | No | No | Yes | Yes | Yes |
| Temperature | 550 C. | 450 C. | 500 C. | 550 C. | 500 C. |
| Time | 100 Hr | 200 Hr | 20 Hr | 10 Hr | 10 Hr |
| Product | $Na_2Ca(CO_3)_2$ | $K_2Ca(CO_3)_2$ | $NaKCa(CO_3)_2$ | $Na_2Ca(CO_3)_2$ | $Na_2Ca(CO_3)_2$ |
| Co-Product |  |  |  | $Na_2CO_3$ | $CaCO_3$ |

EXAMPLES VII–XI

In the following examples, the builder material according to the invention is produced as indicated in a high temperature stirred oven and is sized by crushing and sieving.

|  | VII | VIII | IX | X | XI |
|---|---|---|---|---|---|
| $Na_2CO_3$ | 1 M | 2 M | 1 M | 1.6 M | 2 M |
| $K2CO_3$ |  |  | 1 M | 0.4 M |  |
| $CaCO_3$ | 1 M | 1 M | 2 M | 2 M | 1 M |
| $CO_2$ Pressure (atm.) | 1 | 2 | 1 | 1 | 4 |
| Stirring | Yes | Yes | Yes | Yes | Yes |
| Temp. | 550 C. | 650 C. | 500 C. | 450 C. | 700 C. |
| Time | 15 Hr | 4 Hr | 20 Hr | 100 Hr | 2 Hr |
| Product | $Na_2Ca(CO_3)_2$ | $Na_2Ca(CO_3)_2$ | $NaKCa(CO_3)_2$ | $Na_{1.6}K_{0.4}Ca(CO_3)_2$ | $Na_2Ca(CO_3)_2$ |
| Co-Prod. |  | $Na_2CO_3$ |  |  | $Na_2CO_3$ |

EXAMPLES XII–XVI

In the following examples, the builder material according to the invention is produced as indicated in a high temperature stirred oven and is sized by grinding and sieving.

|  | XII | XIII | XIV | XV | XVI |
|---|---|---|---|---|---|
| $Na_2CO_3$ | 1 M |  | 1 M | 1.4 M | 1 M |
| $NaHCO_3$ | 2 M | 2 M |  |  |  |
| $KHCO_3$ |  |  | 2 M | 1.2 M |  |
| $CaCO_3$ | 1 M | 1 M | 2 M | 2 M |  |
| $CO_2$ Pressure (atm.) | 1 | 1 | 1 | 1 | 4 |
| Stirring | Yes | Yes | Yes | Yes | Yes |
| Temp. | 550 C. | 650 C. | 500 C. | 450 C. | 700 C. |
| Time | 10 Hr | 5 Hr | 20 Hr | 100 Hr | 3 Hr |
| Product | $Na_2Ca(CO_3)_2$ | $Na_2Ca(CO_3)_2$ | $NaKCa(CO_3)_2$ | $Na_{1.4}K_{0.6}Ca(CO_3)_2$ | $Na_2Ca(CO_3)_2$ |
| Co-Prod. | $Na_2CO_3$ |  |  |  |  |

EXAMPLES XVII–XXI

In the following examples, the builder material according to the invention is produced as indicated in a stirred tank and is spray dried in a standard drying tower.

|  | XVII | XVIII | XIX | XX | XXI |
|---|---|---|---|---|---|
| $Na_2CO_3$ |  | 1 M | 2 M |  | 1 M |
| $NaHCO_3$ | 2 M | 2 M |  | 2 M | 2 M |
| $Ca(OH)_2$ | 1 M | 1 M |  | 1 M | 1 M |
| $CaCl_2$ |  |  | 1M |  | 1 M |
| Water | Yes | Yes | Yes | Yes | Yes |
| Seed Crystal |  |  | Yes |  | Yes |
| Stirring | Yes | Yes | Yes | Yes | Yes |
| Filter | Yes | Yes | Yes |  |  |
| Fluid Bed Dry | Yes | Yes | Yes |  |  |
| Spray Dry |  |  |  | Yes | Yes |
| Product | $Na_2Ca(CO_3)$ | $Na_2Ca(CO_3)_2$ | $Na_2Ca(CO_3)_2$ | $Na_2Ca(CO_3)_2$ | $Na_2Ca(CO_3)_2$ |
| Co-Prod. |  | $Na_2CO_3$ | NaCl |  | NaCl & $CaCO_3$ |

EXAMPLE XXVII
Index of Surface Activity

This Example illustrates detergent compositions in accordance with the Index of Surface Activity aspect of the invention. A detergent formulation is contemplated in which $C_{12-13}$ linear alkylbenzene sulfonate (LAS), acrylic acid/maleic acid (PAMA) co-polymer and possibly a sugar (for example those sugars disclosed in U.S. Pat. No. 4,908,159, Davies et al, issued Mar. 13, 1990) are intended to be used along with $Na_2Ca(CO_3)_2$.

The following illustrates a step-by-step procedure for determining the amount of LAS and PAMA that can be used in the detergent formulation.

1. Add to 500 ml of 35° C. water with a calcium carbonate hardness of 5 grains per gallon, sufficient $Na_2Ca(CO_3)_2$ to produce a 300 ppm solution of $Na_2Ca(CO_3)_2$.

2. Stir and maintain water temperature at 35° C. during the experiment;

3. Record the pH of the solution at 30 second intervals for up to 15 minutes.

4. Repeat steps 1 through 3 with LAS added to the solution of step 1 at the concentration indicated by the intended usage conditions of the detergent formulation (e.g. 100 ppm of LAS).

5. Subtract the pH values in step 4 from the pH values in step 3 and record the largest positive difference. This value normalized as below then becomes the constant A in the Index of Surface Activity equation.

6. Steps 4 and 5 are then repeated with PAMA added at the concentration indicated by the intended usage conditions of the detergent formulation in addition to LAS added at the concentration indicated by the intended usage conditions of the detergent formulation (e.g. 50 ppm of PAMA).

7. If the Index of Surface Activity is satisfied in both Steps 5 and 6, then use of LAS and PAMA at the intended levels is satisfactory. If the Index is not satisfied, then the concentrations of the LAS and/or the PAMA must be decreased in order to satisfy the Index. Alternatively, a process aid such as a sugar (for example those sugars disclosed in U.S. Pat. No. 4,908,159, Davies et al, issued Mar. 13, 1990) can be added to the formula and step 6 repeated at increasing levels of sugar until the Index is satisfied.

8. The pH difference value is normalized by the following equation:

$$A = [(\Delta \text{ pH max for ingredient})/(\Delta \text{ pH max for } C_{12-13} \text{ LAS @ 100 ppm})] * 0.5$$

If the normalized value of A is zero, it is assumed the Index is satisfied.

Having thus described the invention in detail, it will be clear to those skilled in the art that various changes may be made without departing from the scope of the invention and the invention is not to be considered limited to what is described in the specification.

What is claimed is:

1. A process of making a crystalline builder for use in a cleaning composition comprising the steps of:
   (a) blending $Na_2CO_3$ with $Ca(CO_3)$ at a molar ratio of at least about 2:1 to form a blended mixture;
   (b) heating said blended mixture until said builder is formed, wherein said builder is crystalline and has the formula $Na_2Ca(CO_3)_2$ and said heating step is performed at a temperature of at least 350° C. for at least 0.5 hours in a $CO_2$ atmosphere;
   (c) grinding or crushing said builder such that the particle size of said builder is from about 0.1 microns to about 50 microns.

* * * * *